United States Patent [19]

Mitsui et al.

[11] Patent Number: 4,921,744
[45] Date of Patent: May 1, 1990

[54] HONEYCOMB STRUCTURE OF AROMATIC POLYIMIDE

[75] Inventors: Kazuhiko Mitsui; Kazuo Kumamoto; Keiichirou Koyashiki, all of Yamaguchi, Japan

[73] Assignee: Ube Industries, Ltd., Yamaguchi, Japan

[21] Appl. No.: 302,944

[22] Filed: Jan. 27, 1989

[30] Foreign Application Priority Data

Jan. 27, 1988 [JP] Japan .................................. 63-16487

[51] Int. Cl.$^5$ .............................................. B32B 3/12
[52] U.S. Cl. ...................................... 428/116; 52/806; 156/197; 428/473.5
[58] Field of Search ................ 428/34.5, 116, 73, 117, 428/118, 473.5; 52/806; 156/197

[56] References Cited

U.S. PATENT DOCUMENTS

| 4,197,341 | 4/1980 | Rule | 428/116 X |
| 4,453,367 | 6/1984 | Geyer et al. | 52/806 |
| 4,659,598 | 4/1987 | Traut | 428/34.5 X |
| 4,767,656 | 8/1988 | Chee et al. | 428/116 |

OTHER PUBLICATIONS

Honeycomb Materials and Applications, An Article by John I. Corden and Thomas N. Bitzer—Hexcel Corp., Dublin, CA.—32nd International Sampe Symposium, Apr. 6–9, 1987.

Primary Examiner—Henry F. Epstein
Attorney, Agent, or Firm—McAulay Fisher Nissen & Goldberg

[57] ABSTRACT

A new honeycomb core structure of heat-resistant aromatic polyimide is disclosed. The structure comprises plural aromatic polyimide sheets having a second-order transition temperature in the range of 250° C. to 400° C. wherein adjoining aromatic polyimide sheets are adhered to each other by welding the two sheets in regions apart from each other at equal intervals and the welding regions on one side of any aromatic polyimide sheet are located at positions shifted from positions of welding regions arranged on another side of the sheet. The honeycomb structure is formed by extending the combined aromatic polyimide sheets in the direction vertical to the plane of the polyimide sheets while heating the sheets at a temperature higher than their second-order transition temperature.

12 Claims, 3 Drawing Sheets

HONEYCOMB STRUCTURE OF AROMATIC POLYIMIDE

BACKGROUND OF THE INVENTION

1. Field of the Invention

The present invention relates to a honeycomb structure having a high heat resistance. More particularly, the invention relates to a heat resistant honeycomb core having a sandwich structure, which is favorably employable for the manufacture of airplanes, railway vehicles, automobiles, hovercrafts, architectures, aerospace structures (e.g., satellite, and developable solar cell paddles for satellite), etc.

2. Description of Prior Art

There have been heretofore known various honeycomb structures such as a honeycomb core made of metal foil such as aluminum foil as described in Japanese Patent Publication No. 59(1984)-40621, a honeycomb core made of plastic material such as polyethylene, polypropylene, polyvinyl chloride and polyester as described in Japanese Patent Publication No. 59(1984)-32306 and Japanese Patent Provisional Publications No. 60(1985)-190340 and No. 60(1985)-245547, and a honeycomb core made of paper.

However, those known honeycomb cores are insufficient in their lightweight property and/or and heat resistance.

An aromatic polyimide is excellent from the viewpoints of the lightweight property and heat resistance, but a conventionally known aromatic polyimide in the form of sheet or film exhibits minimal flexure-deformation property even under heating at elevated temperatures. Further, no adequate adhesive employable for the preparation of a honeycomb core according to a method comprising extending sheets or films has been known, so that a honeycomb core of aromatic polyimide has been not yet prepared industrially and not used practically.

In view of the demand for a heat-resistant honeycomb structure, the present inventors already invented a new honeycomb structure of aromatic polyimide (see U.S. patent application Ser. No. 290,461, filed on Dec. 27, 1988).

SUMMARY OF THE INVENTION

It is an object of the present invention to provide a novel honeycomb structure of an aromatic polyimide (i.e., aromatic polyimide honeycomb core).

It is another object of the invention to provide a process for industrially preparing the aromatic polyimide honeycomb core.

There is provided by the present invention a honeycomb structure of an aromatic polyimide comprising plural aromatic polyimide sheets wherein two adjoining aromatic polyimide sheets having a second-order transition temperature in the range of 250° C. to 400° C. are combined to each other by welding the adjoining sheets in regions apart from each other at equal intervals and the welding regions on one side of any aromatic polyimide sheet are located at positions shifted from positions of welding regions arranged on another side of said sheet, said plural aromatic polyimide sheets being extended in the direction vertical to the plane of the polyimide sheets to form a honey comb structure.

The aromatic polyimide honeycomb core of the invention is lightweight and has high mechanical strength and high heat resistance. Further, the honeycomb core shows high radiation resistance. This is especially advantageous when the honeycomb is used in aerospace.

DETAILED DESCRIPTION OF THE INVENTION

Figure 1:
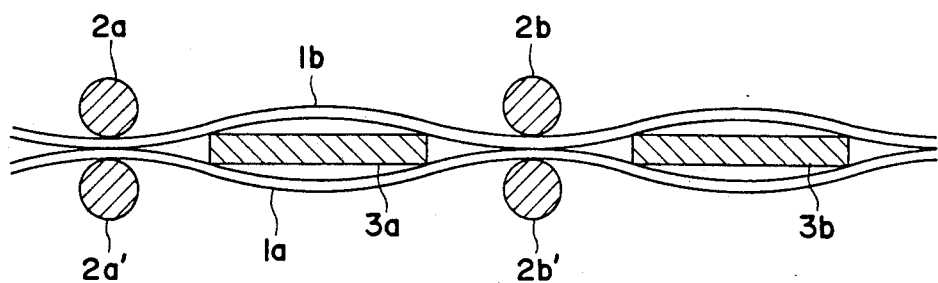
FIGS. 1 and 2 are cross sectional views illustrating a process of combining aromatic polyimide sheets to prepare a honeycomb structure of the invention.

The aromatic polyimide sheet (including a film) employable in the present invention can be made of any kind of aromatic polyimide, provided that the aromatic polyimide sheet has a second-order transition temperature in the range of 250° to 400° C., preferably in the range of 260° to 380° C. The second-order transition temperature of the aromatic polyimide sheet can be measured by a dynamic viscoelasticity-measuring method for measuring dynamic viscoelasticity using a mechanical spectrometer (e.g., mechanical spectrometer produced by Leometrix Co., Ltd.).

The aromatic polyimide sheet of the invention preferably has a tensile elongation of not less than 120%, more preferably in the range of 130 to 300%, when measured in tensile test at 100° C., and a thickness of 5 to 5,000 μm, preferably 10 to 3,000 μm, more preferably 20 to 2,000 μm. Further, the aromatic polyimide sheet preferably is a sheet of an optional size (width: approx. 1–50 mm, preferably approx. 2–40 mm) which is cut from a continuous sheet material having smooth surface or is a substantially continuous sheet material having smooth surface.

The aromatic polyimide sheet having the specific second-order transition temperature can be prepared as follows.

An aromatic tetracarboxylic acid component (i.e., aromatic tetracarboxylic acid or its derivative) is caused to react with an aromatic diamine in an organic polar solvent such as an amide-type solvent or a phenol-type solvent to produce a solvent-soluble polyamic acid or polyimide in the reaction liquid through polymerization, so as to obtain a polymer solution containing the polyamic acid or polyimide homogeneously dissolved in the solvent. The polymer solution can be used as a film-forming dope liquid to form a film or sheet according to a known solution-casting method, etc., and the film or sheet is finally subjected to heat treatment.

Examples of the aromatic tetracarboxylic acid components employable in the preparation of the polymer solution include 2,3,3',4'- or 3,3',4,4'-biphenyltetracarboxylic acid, 3,3',4,4'-benzophenonetetracarboxylic acid, bis(3,4-carboxyphenyl)methane, 2,2-bis(3,4-carboxyphenyl)propane, dianhydrides thereof, esters thereof, salts thereof, and mixtures of those compounds.

The aromatic polyimide sheet employed in the invention is preferably an aromatic polyimide sheet of biphenyltetracarboxylic acid-type produced from a polymer from a polymer solution which is prepared through polymerization reaction using an aromatic tetracarboxylic acid or its derivative mainly containing a biphenyltetracarboxylic acid or its derivative such as 3,3',4,4'-biphenyltetracarboxylic dianhydride (preferably not less than 60 mole %, more preferably not less than 70 mole %, based on the whole amount of all acid components). The thus produced aromatic polyimide sheet favorably shows the aforementioned second-order transition temperature and shows easiness in various stages of the process for preparation of a honeycomb core such as the film-forming stage or honeycomb structure-forming stage. Moreover, the polyimide sheet is also preferred from the viewpoints of heat resistance, radiation resistance, mechanical strength, etc.

The aforementioned aromatic tetracarboxylic acid or its derivative mainly containing biphenyltetracarboxylic acid or its derivative may further contain pyromellitic acid or its dianhydride as well as other aromatic tetracarboxylic acids and their derivatives.

The aromatic diamine preferably contains an aromatic diamine compound having at least two benzene rings (particularly 2–5 benzene rings) as a main component. Examples of such aromatic diamine compounds include diphenylether diamine compounds such as 4,4'-diaminodiphenylether, 3,4'-diaminodiphenylether and 3,3'-diaminodiphenylether; diphenylsulfone diamine compounds such as 4,4'-diaminodiphenylsulfone and 3,4'-diaminodiphenylsulfone; diphenylmethane diamine compounds such as 4,4'-diaminodiphenylmethane, 3,4'-diaminodiphenylmethane and 3,3'-diaminodiphenylmethane; and other aromatic diamine compounds such as 1,4-bis(4-aminophenoxy)benzene, o-tolidine and o-tolidinesulfone.

The aromatic polyimide sheet most favorably employed in the invention can be prepared, for example, by the following process.

An aromatic tetracarboxylic acid or its derivative containing the biphenyltetracarboxylic acid or its derivative in an amount of not less than 80 mole % and an aromatic diamine containing 80 mole % or more of the aromatic diamine having two or more benzene rings, such as, diaminodiphenylether, diaminodiphenylmethane or diaminodiphenylsulfone are polymerized with each other in an organic polar solvent at an appropriate temperature to produce a high-molecular weight solvent-soluble polymer (aromatic polyamic acid or biphenyltetracaroboxylic acid type or aromatic polyimide thereof) in the reaction liquid, so as to obtain a polymer solution having a polymer concentration of approx. 5 to 30 wt.%. The polymer solution (dope liquid) is cast on a smooth surface of a support such as a metallic belt and a metallic drum to form a thin film of the polymer solution on the support (solution casting). Then, the thin film is heated at a temperature of approx. 50° to 300° C. to remove the organic polar solvent from the thin film through evaporation. If necessary, the polyamic acid is subjected to an imidation reaction. Further, if necessary, the obtained thin film is again heated to a temperature of 300° C to 600° C. to cure the film. Thus, an aromatic polyimide sheet is obtained.

Examples of the organic polar solvents employable for the preparation of a polyamic acid solution for the dope liquid used in the preparation of the aromatic polyimide sheet include amide solvents such as N-methyl-2-pyrrolidone, dimethylformamide, diethylformamide, dimethylacetamide, diethylacetamide and dimethylsulfoamide.

Examples of the organic polar solvents employable for preparing a polyimide solution (dope liquid) used in the preparation of the aromatic polyimide sheet include phenol solvents such as phenol, cresol and halogenated phenol (e.g., p-chlorophenol).

In the present invention, the aromatic polyimide or the aromatic polyamic acid preferably has a logarithmic viscosity ranging from 0.5 to 7.0 when measured under the conditions of temperature of 50° C., concentration of 0.5 g/100 ml-solvent and a solvent of p-chlorophenol or N-methyl-2-pyrrolidone.

A process for preparing a honeycomb structure of aromatic polyimide of the present invention will be now described in detail, with reference to the accompanying drawings.

Figure 2:
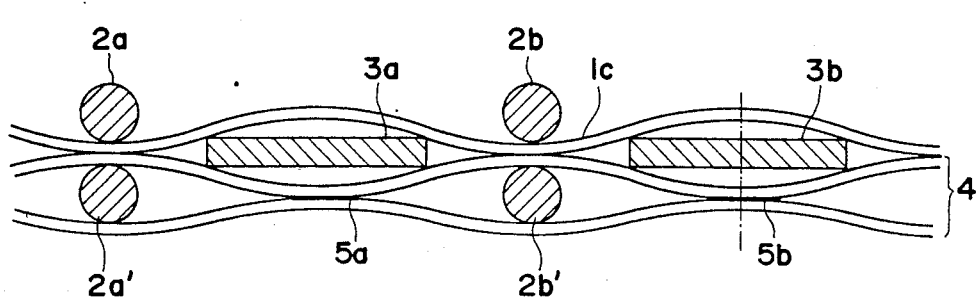

FIG. 1 and FIG. 2 are cross-sectional views illustrating an embodiment of a process of laminating aromatic polyimide sheets with combining each other by welding according to the invention.

As shown in FIG. 1, two aromatic polyimide sheets 1a, 1b are laminated one on another under the conditions that spacers 3a, 3b, . . . are placed between these sheets at equal intervals. Thus laminated polyimide sheets are nipped by pairs of heat sealers 2a, 2a', 2b, 2b', . . . arranged at equal intervals. The pair of heat sealers are heated under pressure to weld the polyimide sheets at the nipped portions to form a laminate of which two sheets are combined at the welded regions (i.e., welds). The spacers and the heat sealers are subsequently removed from the laminate Then, as shown in FIG. 2, the spacers 3a, 3b, . . . are placed on the laminate 4 at the welding regions in the same manner as above, and another polyimide sheet 1c is placed over the laminate 4. The pair of the sheet 1b and the sheet 1c of the resulting composite is nipped by pairs of heat sealers 2a, 2a', 2b, 2b', . . . arranged at equal intervals with a shift of their positions from the previously formed welds 5a, 5b, . . . by a half of the interval between two adjoining spacers. The pairs of heat sealers are again heated under pressure to weld the polyimide sheets at the nipped portions to form a laminate of which two sheets are combined at another welding regions (i.e., welds). The spacers and the heat sealers are subsequently removed from the laminate, in the same manner as above.

The above procedure of welding is repeated for one or more polyimide sheets to laminate on the combined composite.

In the above procedure, it is preferable that each pair of heat sealers are arranged at the center of each space between the welding regions 5a, 5b of the adjoining sheets. If the heat sealers are arranged at the centers of the spaces, namely, over the previously set welding regions (welds), the welding regions are shifted by a half of the space between one side of the polyimide sheet and another side of the sheet. Using the thus combined composite, a honeycomb strucucture of high strength can be obtained.

Figure 3:
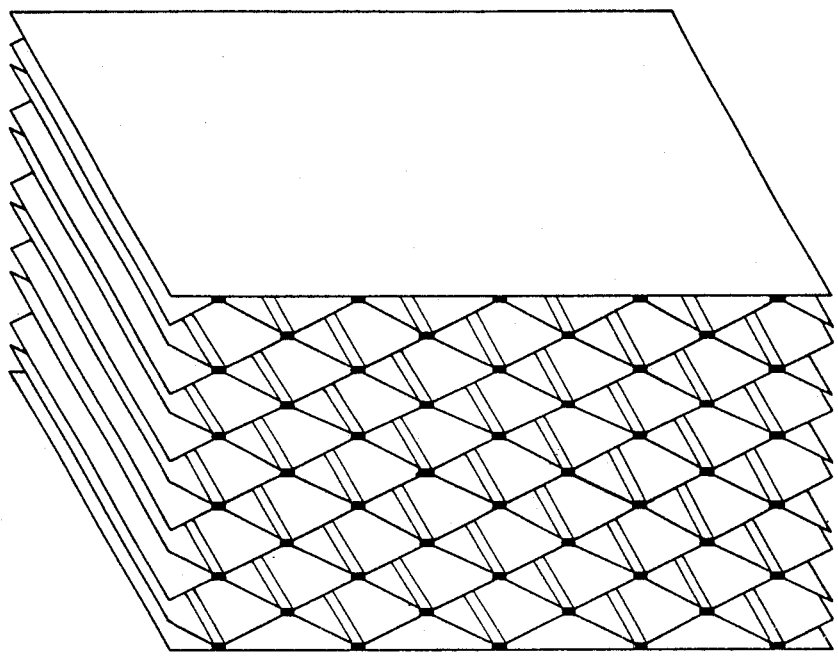
FIG. 3 is a perspective view illustrating an embodiment of the honeycomb structure of aromatic polyimide sheets according to the invention.
Figure 4:
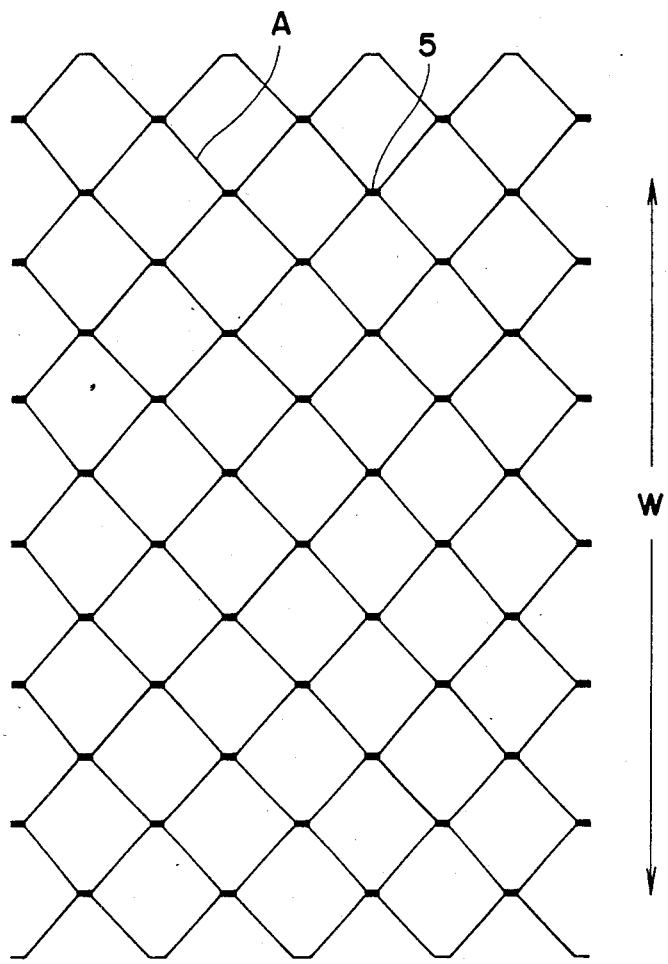
FIG. 4 is a sectional view illustrating a honeycomb structure according to the invention.

In FIGS. 3 and 4, length of the interval (i.e, space, corresponding to "A" in FIG. 4) of each welding region is appropriately set for forming one side of a honeycomb structure of polygonal form. For instance, the length of the interval is in the range of approx. 5 to 20 mm.

The heating means can be a known heat sealer which is employable for welding plastic sheets or films. There is no specific limitation with respect to the form, etc., so long as it can supply heat to the polyimide sheets while nipping the sheets as described above. For example, the heat sealer may be a simple rod having a circular cross section or a rod having an edge on the side to be applied onto the sheet. The heat sealer is preferably coated with a releasing material or agent to avoid adhesion of the heat sealer to the applied sheets.

The above-described procedure of applying heat and pressure for welding each sheet can be conducted in such a manner that the portions of the polyimide sheets nipped by pairs of the heat sealers are heated to a temperature higher than the second-order transition temperature of the employed polyimide sheet by 10° 200° C., preferably 20° to 150° C. The applied pressure preferably ranges from 1 to 2,000 kg/cm$^2$, preferably 10 to 500 kg/cm$^2$, and more preferably 30 to 50 kg/cm$^2$, The welding procedure is generally performed for a period of 0.1 sec. to 2 hours, preferably 30 secs. to 1 hour, and more preferably 1 to 10 minutes.

The width of each welding region (weld) of the laminated sheets preferably ranges from 0.1 to 20 mm, and more preferably ranges from 0.5 to 10 mm.

The welding procedure can be conducted without using spacers, but the use of the spacers is preferred.

Examples of materials of the spacer include glass plates, silicone sheets, inorganic materials such as iron foil, iron plate and copper plate coated with a releasing material, and sheets of plastic materials such as polyimide obtained from a tetracarboxylic acid component mainly containing a biphenyltetracarboxylic acid or its derivative and a diamine mainly containing a phenylene diamine or fluoro-resin. The thickness and the width of the spacer can be optionally selected in consideration of the length of one side A of a honeycomb structure of a polygonal form and the length of welding regions. For exmple, the thickness of the spacer is approx. 1 to 1,000 μm, the width thereof is approx. 5 to 50 mm.

If the obtained laminate is in a continuous form, the laminate is generally cut in its width direction to give a desired shape. If necessary, the laminate may be cut in the direction crossing the welding region (i.e., longitudinal direction of the laminate). The cutting procedure can be carried out using a conventional cutting device such as a bandsaw.

The laminate prepared as above is then extended in the direction vertical to the plane of the laminate (W direction in FIG. 4) at a temperature, for instance, not lower than the aforementioned second-order transition temperature, preferably a temperature higher than the second-order transition temperature by approx. 1° to 20° C. under application of an appropriate extending force, to form a honeycomb structure as shown in FIG. 4. In the invention, the honeycomb structure obtained by extending the laminate at an elevated temperature is then preferably cooled to room temperature keeping the same structure, to obtain the desired honeycomb core of aromatic polyimide. The cooling of the honeycomb structure can be conducted by any known method under known conditions.

An example of the present invention is given below.

EXAMPLE 1

Twenty aromatic polyimide sheets of belt form (thickness: 50 μm, width: 2 cm, second-order transition temperature measured by dynamic viscoelasticity measuring method: 285° C., tensile elongation by tensile test at 100° C.: 130%, tensile elongation at second-order transition temperature: 250%) were prepared from a p-chlorophenol solution of an aromatic polyimide (logarithmic viscosity: 3.4, pressed from 3,3',4,4'-biphenyl-tetracarboxylic dianhydride (s-BPDA) and 4,4'-diaminodiphenylether (DADE)) according to a solution casting method.

The spacers of rectangular form (made of an aromatic polyimide sheet obtained by polymerization of s-BPDA and p-phenylene diamine at equal molar amounts; thickness: 50 μm, width: 5 mm, length: 40 mm) were placed at 6 mm intervals on the aromatic polyimide sheet in such manner that the longitudinal direction of the spacers were arranged in parallel to the width (traverse) direction of the sheet, then another sheet was placed thereon. Subsequently, the two sheets having the spacers therebetween were nipped by pairs of heat sealers of rod type having diameter of 4 mm at the center of each interval of the spacers. Then, the laminated two sheets were welded using the heat sealers for five minutes at temperature of 300° C. and pressure of 300 kg/cm$^2$ to form a laminate in which the aromatic polyimide sheets were combined to each other at a number of welding regions of length of 1 mm apart from each other by space of 10 mm.

The heat sealers and the spacers were taken away from the combined laminate. Then, other spacers were arranged on the laminate, and another aromatic polyimide sheet made of the same material was placed thereon. The spacers were arranged in such manner that their centers were located on the positions corresponding to the previously formed welding regions of the adjoining sheets at the same intervals as before. The laminated sheets having the spacers therebetween were combined to give an integral body by conducting the same welding procedure as above. The same welding procedure was repeated using the remaining 17 sheets in sequence to form an integrally combined laminate composed of 20 aromatic polyimide sheets.

The resulting laminate was extended in the lamination direction (which was perpendicular to the plane of the sheet) at 295° C. to form a honeycomb structure. The honeycomb structure was cooled to room temperature to set the extended structure.

The aromatic polyimide honeycomb structure obtained as above showed a compression strength of more than 4.2 kg/cm$^2$ at 25° C.

As for the compression strength, more than 75% of the primary value (4.2 kg/cm$^2$) was kept even under heating the honeycomb to 200° C., and further not less than 90% of the primary value was kept even under chilling the honeycomb to −60° C.

We claim:

1. A honeycomb structure of aromatic polyimide comprising plural aromatic polyimide sheets wherein the adjoining aromatic polyimide sheets are prepared from an aromatic tetracarboxylic acid or its derivative and an aromatic diamine and having a second-order transition temperature in the range of 250° C. to 400° C. and are combined to each other by welding the adjoining sheets in regions apart from each other at equal intervals, the welding regions on one side of any aromatic polyimide sheet being located at positions shifted from the welding regions on another side of said sheet, said plural aromatic polyimide sheets extending in the direction vertical to the plane of the polyimide sheets to form a honeycomb structure.

2. The honeycomb structure as claimed in claim 1, wherein the aromatic polyimide sheet is prepared from an aromatic tetracarboxylic acid or its derivative containing a biphenyltetracarboxylic acid or its derivative in an amount of not less than 60 mole % and an aromatic diamine containing an aromatic diamine having at least two benzene rings in the molecular structure in an amount of not less than 80 mole %.

3. The honeycomb structure as claimed in claim 1, wherein the welding regions on one side of any aromatic polyimide sheet are shifted from the positions of the welding regions arranged on another side of said sheet by one half of the space between two adjoining welding regions on the sheet.

4. The honeycomb structure as claimed in claim 1, wherein the aromatic polyimide shows a logarithmic viscosity ranging from 0.5 to 7.0 when measured under the condition of temperature of 50° C., concentration of 0.5 g in 100 ml of p-chlorophenol.

5. A process for preparing a honeycomb structure of an aromatic polyimide having a second-order transition temperature in the range from 250° C. to 400° C. comprising the steps of:
(a) forming a laminate of two aromatic polyimide sheets by welding a first aromatic polyimide sheet superimposed on a second aromatic polyimide sheet layer, such that the welds are spaced at equal intervals from one another and the unwelded areas of the first and second sheets are spaced apart from one another;
(b) adding another superimposed aromatic polyimide sheet to said laminate by welding said sheet to one of said first or second aromatic polyimide sheets at welding positions laterally equidistant from the welding positions of said first or second sheet; and
(c) repeating step (b) so as to increase the number of aromatic polyimide sheets in said laminate while heating the sheets being welded at a temperature higher than the second-order transition temperature of said aromatic polyimide sheets.

6. The process of claim 5 wherein the welding is carried out under pressure and by placing the sheets to be welded between heat sealing elements located at said welding positions.

7. The process for preparing a honeycomb structure as claimed in claim 5, the welding is performed for 0.1 sec. to 2 hrs. at pressure of 1 to 2,000 kg/cm$^2$ while heating the aromatic polyimide sheets at a temperature higher than the second-order transition temperature by 10° to 200° C.

8. The process for preparing a honeycomb structure as claimed in claim 5, the step of extending the combined aromatic polyimide sheets is performed under heating the polyimide sheets at a temperature higher than the second-order transition temperature by 1° to 20°C.

9. A process for preparing a honeycomb structure of aromatic polyimide having a second order transition temperature in the range of 250° C. to 400° C. comprising the steps of:
preparing a composite of laminated plural aromatic polyimide sheets;
securing adjoining polyimide sheets of the composite to each other by welding the adjoining sheets in regions apart from each other at equal intervals wherein the welding regions on one side of an aromatic polyimide sheet are located at positions shifted from the positions of the welded regions arranged on another side of said sheet; and
extending the combined aromatic polyimide sheets in the direction vertical to the plane of the polyimide sheets while heating the sheets at a temperature higher than the second-order transition temperature to form a honeycomb structure.

10. The process of claim 9 wherein the welding is carried out under pressure and by placing the sheets to be welded between heat sealing elements located at said welding positions.

11. The process for preparing a honeycomb structure as claimed in claim 9 wherein the welding is performed for 0.1 sec. to 2 hrs. at a pressure of 1 to 2,000 kg/cm$^2$ while heating the aromatic polyimide sheets at a temperature higher than the second-order transition temperature by 10° to 200° C.

12. The process for preparing a honeycomb structure as claimed in claim 9 wherein the step of extending the combined aromatic polyimide sheets is performed under heating the polyimide sheets at a temperature higher than the second-order transition temperature by 1° to 20° C.

* * * * *